Feb. 18, 1941. W. F. GALL 2,232,107
MEANS FOR MAINTAINING FISHING RODS AND THE LIKE IN ADJUSTED
POSITIONS AGAINST ROLLING RELATIVE TO A SUPPORT SURFACE
Filed July 20, 1939

William F. Gall
INVENTOR

BY Victor J. Evans & Co.
ATTORNEYS

Patented Feb. 18, 1941

2,232,107

UNITED STATES PATENT OFFICE 2,232,107

MEANS FOR MAINTAINING FISHING RODS AND THE LIKE IN ADJUSTED POSITIONS AGAINST ROLLING RELATIVE TO A SUPPORT SURFACE

William F. Gall, Springdale, Pa.

Application July 20, 1939, Serial No. 285,604

1 Claim. (Cl. 43—25)

My invention relates to anti-rolling devices and more particularly to means for maintaining fishing rods and the like in adjusted positions against rolling relative to a supporting surface.

Another object of my invention is to provide an anti-rolling device so constructed and arranged that when the same is attached to the rear end section of a fishing rod and in engagement with a supporting surface it will preclude rolling or overbalancing of said rod and thereby permit said rod to be supported in an angular position relative to said surface and in a manner to preclude interference of the fishing line on said rod with a supporting object.

A further object of my invention is to provide an anti-rolling device of the above described character which is simple in construction, durable in use, efficient in operation, economical in manufacture, and capable of attachment to rods already in use without modifying the same.

Other objects and advantages will be apparent from the following description, appended claim and annexed drawing.

Referring to the drawing wherein like reference characters designate like parts throughout the several views.

Figure 1:
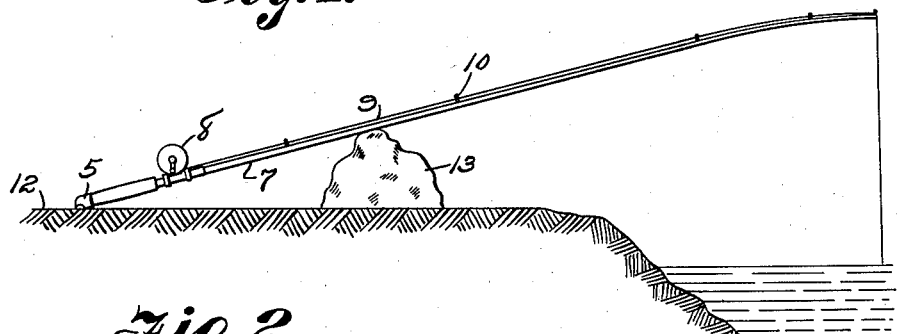
Figure 1 is a side elevation of my invention illustrating the same as applied to the rear end of a fishing rod, the latter being supported in an inclined position over a supporting surface.
Figure 2:
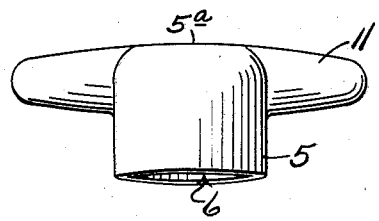
Figure 2 is a top plan view of my invention.
Figure 3:
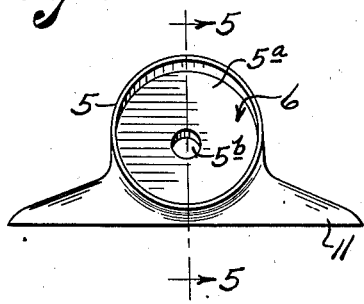
Figure 3 is an end elevation thereof.
Figure 5:
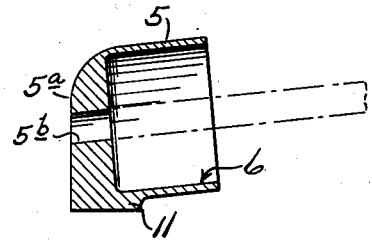
Figure 5 is a sectional view taken on the line 5—5 of Figure 3.
Figure 4:
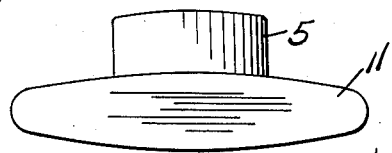
Figure 4 is a bottom plan view of my novel form of anti-rolling device.

In practicing my invention, as illustrated in the drawing, I provide an anti-rolling device formed with a cylindrical body 5 fashioned with a cul-de-sac 6 in which is secured the rear end section of a fishing rod 7, the latter being provided adjacent the rear end section with a reel 8 to which is connected a fishing line 9 extending towards the front end section of said rod and slidably connected to the latter by means of keepers or eyes 10. The rear wall 5a of the body 5 is provided with an opening 5b for receiving therethrough a screw, rivet or other similar fastening means (not shown) whereby the body may be permanently secured to the rear end section of the fishing rod 7, if so desired.

The body 5 is fashioned at one end with an elongated subjacently arranged base 11 extending at right angles to the longitudinal axis of the body. The base is formed with a substantially plane under face and of a sufficient length to extend beyond each side of the body whereby to maintain said body against rolling movement relative to a supporting surface, for instance the ground 12, when the under face is in engagement therewith.

In use, the body being attached to the rear end of the fishing rod 7, the rod is supported in angular relation to the supporting surface or ground 12 by means of an object, for instance a rock 13, and when thus supported the rod is adjusted to dispose the line 10 in subjacent relation therewith whereby to preclude interference of the line with the rock 13. When the rod is thus positioned, the under face of the base 11 engages the ground 12 and maintains the rod in said adjusted position and against rolling movement relative to the ground or rock thus permitting free movement of the line at all times during fishing.

It is to be noted that the foregoing described position of the rod is essential in "still" fishing in order that the line may "play out" upon the catching of a fish. Furthermore, it is to be noted that should the rod be arranged in the foregoing position, without any means for maintaining the rod adjusted in said position, the weight and overbalancing of the reel would cause the rod to be rotated or rolled and thereby displace the rod from the adjusted position.

It is obvious that the invention is not confined to the herein described use therefor as it may be utilized for any purpose to which it is adaptable. It is therefore to be understood that the invention is not limited to the specific construction as illustrated and described, as the same is only illustrative of the principles of operation, which are capable of extended application in advance forms, and that the invention comprehends all construction within the scope of the appended claim.

What I claim is:

A device adapted to prevent a fishing rod from turning about its axis when supported in an inclined position by a prop and the ground, said device comprising a socket member closed at its rear end and adapted to be applied to the rear end of the fishing rod, and a bar formed integrally with the socket member for contact with the ground, the bar extending laterally in opposite directions beyond the socket member to prevent the turning of the fishing rod in either direction, the lower surface of the bar being flat and straight and arranged at an angle to the axis of the socket member to permit it to contact throughout its entire area with the ground, and the rear wall of the socket member being of increased thickness and having the bar formed integrally therewith.

WILLIAM F. GALL.